United States Patent Office 2,964,483
Patented Dec. 13, 1960

2,964,483

POLYMER BLEND OF OIL MODIFIED ALKYD RESIN WITH COPOLYMER OF ACRYLAMIDE AND UNSATURATED VINYL MONOMER

Arthur Lee Johnson, Scarborough, Ontario, Max Morf, St. Hilaire, Quebec, and John Keith Whiteley, Agincourt, Ontario, Canada, assignors to Canadian Industries Limited, Montreal, Quebec, Canada, a corporation of Canada No Drawing. Filed Nov. 17, 1958, Ser. No. 774,092

Claims priority, application Great Britain Nov. 26, 1957

17 Claims. (Cl. 260—22)

The present invention relates to novel coating compositions, in particular coating compositions based on blends of alkyd resins with vinyl copolymers, and to a process for preparing these.

Coating compositions have previously been prepared by polymerizing vinyl monomers, such as styrene or methyl methacrylate, in the presence of alkyd resins. Both the method of preparation and the compositions so obtained suffered from a number of disadvantages. Thus, for example, in their preparation, so-called "kettle volume" for the vinylation reaction had to be allowed for during the alkyd cook, and molecular weight of the vinyl polymer was generally lower than desirable.

Probably with a view to avoiding these and other disadvantages, work directed to blending alkyd resins with preformed vinyl polymers has in the past been carried out and reported. It has however, been observed that alkyd resins and vinyl polymers are generally incompatible with the result that films obtained from such blends are not homogeneous but turbid or opaque and possess mechanical properties inferior to those of films obtained from the separate constituents or from compositions prepared as described above. Where the vinyl polymers were compatible severe limitations are, however, encountered as to the amount of vinyl polymer which could be blended with the alkyd resin. Blends of incompatible resins are, moreover, difficult to pigment satisfactorily and did not in general, therefore, find application in the paint and varnish industry.

It has now surprisingly been found that vinyl polymers can be homogeneously blended with alkyd resins and hence that commercially useful coating compositions can be prepared from such blends, provided that the vinyl polymers are copolymers of a vinyl monomer having as part of its structure a basic nitrogen atom or an amido nitrogen atom, and of at least one of the monomers selected from: (1) a compound selected from the group consisting of styrene and alkylated styrenes and (2) an acrylic acid ester of the formula

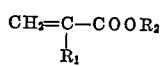

wherein $R_1$ is a member of the group consisting of hydrogen and lower alkyl radicals which may be substituted and $R_2$ is an alkyl radical having from 1 to 6 carbon atoms and which may also be substituted. These copolymers are hereinafter referred to as vinyl copolymers.

Examples of a vinyl monomer having as part of its structure a basic nitrogen atom are vinylpyridine and N;N-dimethylaminoethylmethacrylate, and examples of a vinyl monomer having as part of its structure an amido nitrogen atom are acrylamide, methacrylamide and N-butylacrylamide.

Of the acrylic acid ester monomers, those esters in which $R_2$ of the general formula shown above contains from 1 to 4 carbon atoms are preferred. If the alkyl radical $R_2$ contains more than 6 carbon atoms vinyl copolymers result which are not useful in the preparation of coating compositions since the blends obtained tend to be too soft.

The compositions obtained by blending the above defined vinyl copolymers with alkyd resins give rise to a number of unexpected advantages which are likely to ensure ready commercial acceptance. They exhibit surprising adhesion to metals, in particular steel, are fast drying and show improved gloss and solvent resistance over related conventional systems such as the vinylated alkyds referred to above. Also an important advantage in preparing these blends is that the alkyd resin can first be pigmented by itself and can subsequently be blended with the vinyl copolymers.

The present invention provides, therefore, coating compositions comprising admixtures of vinyl copolymers as defined above and alkyd resins.

The present invention further provides a process for preparing coating compositions comprising admixtures of vinyl copolymers as defined above and alkyd resins.

Amongst the vinyl copolymers of the present invention may be mentioned copolymers of acrylamide with styrene or vinyltoluene, ethyl acrylate, methyl methacrylate, butyl methacrylate, or mixtures thereof. These copolymers may be prepared according to any of the usual solution methods and should preferably have the constituent comers evenly distributed throughout the copolymer. The following two methods illustrate the preparation of a copolymer including vinyltoluene or styrene.

A copolymer of 90% vinyltoluene and 10% acrylamide was prepared by adding to a 12 litre flask:

|  | G. |
|---|---|
| Acrylamide | 300 |
| Vinyltoluene | 1800 |
| Butanol | 450 |
| Xylene | 1050 | and raising the temperature to bring these ingredients to reflux. Over a period of one hour the following ingredients were then added:

|  | G. |
|---|---|
| Vinyltoluene | 900 |
| Xylene | 1500 |
| Benzoyl peroxide | 30 |
| Tert. butyl hydroperoxide | 48 |

The copolymer was obtained after the reaction had been kept at reflux for a further four hours and was found to have a solubility parameter of 9.4.

A copolymer of 25% styrene, 68.75% butyl methacrylate and 6.25% acrylamide was prepared by adding to a 12 litre flask:

|  | G. |
|---|---|
| Acrylamide | 187.5 |
| Butyl methacrylate | 1405 |
| Styrene | 510 |
| Butanol | 551 |
| Xylene | 1286.5 | and raising the temperature to bring these ingredients to reflux. Over a period of one hour the following ingredients were then added:

|  | G. |
|---|---|
| Butyl methacrylate | 600 |
| Styrene | 240 |
| Xylene | 1837.5 |
| Benzoyl peroxide | 30 |
| Tert. butyl hydroperoxide (60% soln. in butanol) | 48 |

The copolymer was obtained after the reaction had been allowed to proceed at reflux temperature for a further four hours and was found to have a solubility parameter of 9.3.

In further embodiments of the present invention there are provided blends of vinyl copolymer and alkyd resin which also include a nitrogen resin, and a process for preparing coating compositions comprising these blends.

The coating compositions obtainable from blends which also include a nitrogen resin may be uncatalysed or catalysed and are adapted for being hardened into infusible and solvent resistant films on baking at elevated temperatures.

The term "nitrogen resin" as used in the specification refers to condensation products of formaldehyde with amino compounds such as, for example, urea-formaldehyde resins, melamine-formaldehyde resins and benzoguanamine-formaldehyde resins.

J. Hildebrand and R. Scott have shown in "The Solubility of Non-Electrolytes," 3rd edition, Reinhold Publishing Corp., New York (1949), that solubility parameters can be calculated for solvents and also for polymers. Furthermore, it has been shown that for two substances to be compatible the difference between their solubility parameters must be small. Indeed, when two polymeric substances are considered the solubility parameter difference must be very small, and it has been suggested less than 0.5, and even when solubility parameters are as closely matched as possible compatibility has not always been found.

Surprisingly it has now been found that where alkyd resins and vinyl copolymers are considered a large number of compatible systems can be produced. This results from the presence in the vinyl copolymer, of groups which are capable of interacting with the residual acid groups of the alkyd resin. When such interaction exists, a surprisingly large difference in solubility parameter for compatible systems can be tolerated. It should, however, be noted that if the alkyd resin is cooked close to the gel point or the vinyl copolymer is of very high molecular weight chances of compatibility will be reduced.

The groups capable of interacting with the residual carboxyl groups in alkyd resin were found to be those containing a basic nitrogen atom and those containing an amido group. Vinyl copolymers, as defined above, include these groups and will be compatible with alkyd resin having an acid number of from 5 to 10 or more even if the difference in solubility parameter between the vinyl copolymer and the alkyd resin is as large as 2 or even 2.5.

Nitrogen resins, too, have solubility parameters and it has been found that these do not vary appreciably from nitrogen resin to nitrogen resin. Thus, the solubility parameter of most nitrogen resins is of the order of 10. It follows that most nitrogen resins blend best with alkyd resins and vinyl copolymers whose solubility parameter is close to 10. This, in general, happens to be the area of greatest practical interest for compositions according to the present invention which also include a nitrogen resin, since in these alkyd resins of about 40–45% oil length are generally preferred. Such alkyd resins generally have solubility parameters of about 10.0 to 9.6.

It is preferred that the content of the vinyl monomer having as part of its structure a basic N-atom or an amido N-atom in the vinyl copolymer range between 7.5 and 10.0%, but it may be higher than 10% or lower than 5% without adversely affecting compositions according to the present invention. As the concentrations of this monomer constituent is reduced in the mixture to be copolymerised to 4% or as low as 3%, it becomes advisable to include, if not already present, acrylates in the copolymer. These acrylates may be present in a concentration ranging from about 10 to about 80%, preferably between 45 and 70%.

The presence of an acrylate as well as styrene or an alkylated styrene in the vinyl copolymers of the present invention generally permits the choice of wider ranges in the compounding of the blends and vinyl copolymers obtained from the three monomers are therefore preferred.

Other monomers such as acrylonitrile, or acrylic acid or glycidyl- or beta-hydroxy-esters of acrylic acid may also be included in small proportions with monomers to form the copolymers of the present invention.

Any conventional so-called oil modified alkyd resin including, for example, benzoic acid modified alkyd resin may be employed according to the present invention. Thus alkyds modified with, for example, tall oil, dehydrated castor oil, linseed oil, soya bean oil, or coconut oil, and having variable oil lengths, may be used. For air drying coating compositions obviously those alkyds modified with drying oils such as China-wood/linseed oil mixtures are particularly useful according to the present invention since they give rise to fast drying films. Alkyds having a high acid number are most useful according to the present invention and it is, therefore, preferred to have oil lengths of the order of 30% to 45%; alkyds having oil lengths longer than 45% tend to blend less well with vinyl copolymers.

In those embodiments in which a nitrogen resin is also included, so-called "acid catalysts" known in the art, such as p-toluene sulphonic acid, boron trifluoride, maleic acid, butyl phosphoric acid or tetrachlorophthalic acid may be used as catalysts in the compositions according to the present invention. Minor proportions of the catalysts, for example, from 0.2 to 0.5% by weight based on the combined vinyl copolymer and nitrogen resin solids content of the compositions, will be sufficient to achieve the objects of the invention. Frequently, catalysis of three component blends of the present invention, that is compositions including vinyl copolymer, alkyd resin and nitrogen resin, will yield perfectly clear films when the same three component blends, uncatalysed, would not have done so.

All the compositions may be prepared by blending the ingredients in any order, but preferably by adding the vinyl copolymer in solution to the alkyd resin which has, if desired, already been pigmented. They are particularly useful as coating compositions for application to light metals, steel, wood and polyvinyl surfaces by spraying or brushing. The compositions will cure at room temperatures or, in the case of compositions which also include a nitrogen resin, at temperatures of from 90° to 150° C. in from 10 to 40 minutes, and will present a glossy surface on drying. When a catalyst is also present in the compositions including a nitrogen resin, temperatures above 120° C. will generally reduce the curing period to from 10 to 20 minutes. Care should, however, be taken in choosing the curing temperature since compatibility may be affected by injudicious choice of temperatures. Other ingredients generally used in coating compositions may also be included, for example, pigments such as titanium dioxide, iron oxides or phthalocyanines.

In the following six examples, which illustrate, but do not limit, the present invention in respect to the blending of vinyl copolymer with alkyd resins only, the alkyd resin was obtained from phthalic anhydride and glycerol modified with dehydrated castor oil to a 44% oil length of acid number 38 and solubility parameter 9.7.

EXAMPLE I

Copolymers of vinyltoluene and acrylamide were blended with the alkyd resin at varying proportions as set out in the table below. The blends were spread on glass slides with a doctor blade and the film so obtained was allowed to dry. The amount of light passing through each dry film was measured optically and the results recorded in the following table as percentage light passed.

| VT/AAm | δ | Alkyd blended with percent Vinyl Copolymer | | |
|---|---|---|---|---|
| | | 25 | 50 | 75 |
| 96/4 | 8.8 | 92.6 | 99.7 | 99.7 |
| 94/6 | 8.9 | 99.7 | 99.8 | 99.8 |
| 92/8 | 9.2 | 99.9 | 99.8 | 99.5 |
| 90/10 | 9.4 | 99.1 | 99.5 | 99.5 |

VT denotes vinyltoluene; AAm denotes acrylamide. A film transmitting more than 96% of light appears clear to the eye. (δ=solubility parameter.)

EXAMPLE II

A copolymer consisting of 10% acrylamide and 90% ethyl acrylate (solubility parameter 11.5) was blended with the alkyd resin at equal proportions. Films of this blend, formed and dried, remained clear.

EXAMPLE III

Ternary copolymers according to the present invention were blended with the alkyd resin and the results recorded as under Example I (δ=solubility parameter).

| Ternary Copolymer | δ | Alkyd blended with percent Vinyl Copolymer | | |
|---|---|---|---|---|
| | | 25 | 50 | 75 |
| EA/S/MAam: | | | | |
| 62.5/30/7.5 | 10.6 | 99.0 | 99.0 | 98.0 |
| MMA/VT/Aam: | | | | |
| 30/60/10 | 10.2 | 99.5 | 99.6 | 99.5 |
| 50/40/10 | 10.7 | 99.9 | 99.9 | 99.9 |
| 70/20/10 | 11.2 | 98.7 | 95.5 | 95.1 |

The symbols used denote: S=styrene, VT=vinyltoluene, MAam=methacrylamide, Aam=acrylamide, MMA=methyl methacrylate, EA=ethyl acrylate.

EXAMPLE IV

A copolymer consisting of 25% styrene, 68.8% butyl methacrylate and 6.25% acrylamide (solubility parameter 9.3) was blended with 25%, 50% and 75% of the alkyd resin, and of the following additional alkyd resins:

(1) Phthalic anhydride condensed with glycerol and modified to 43.4% oil length with linseed/China-wood oil, solubility parameter 9.7 and acid number 13.5.

(2) Phthalic anhydride condensed with glycerol and modified to 37.2% oil length with coconut oil, solubility parameter 10.0 and acid number 7.5.

Films drawn and dried from each of the blends were clear.

EXAMPLE V

A copolymer consisting of 92% vinyltoluene and 8% dimethylaminoethylmethacrylate (δ=8.5) was blended with 25%, 50% and 75% of the following alkyd resins:

(1) Phthalic anhydride condensed with glycerol and modified to 56% oil length with tall oil fatty acids (δ=9.5, AN=6.5).

(2) Phthalic anhydride condensed with glycerol and modified to 44% oil length with dehydrated castor oil (δ=9.7, AN=3.8).

(3) Phthalic anhydride condensed with glycerol and modified to 37.2% oil length with coconut oil (δ=10.0, AN=7.5).

Films drawn and dried from each of the blends were clear (δ=solubility parameter).

EXAMPLE VI

A copolymer consisting of 92% styrene and 8% 4-vinylpyridine (δ=9.0) was blended with 50% of the following alkyds:

(1) Phthalic anhydride condensed with glycerol and modified to 44% oil length with dehydrated castor oil (δ=9.7, AN=38).

(2) Phthalic anhydride condensed with glycerol and modified to 24% oil length with tall oil fatty acids (δ=11.3, AN=92.5).

Films drawn and dried from each of the blends were clear (δ=solubility parameter).

The following five examples illustrate, but do not limit, those embodiments of the present invention which in addition to vinyl copolymer and alkyd resin also include a nitrogen resin.

EXAMPLE VII

A blend of a vinyl copolymer, an alkyd resin and a urea-formaldehyde resin was made in the following proportions.

| | Percent |
|---|---|
| Vinyl copolymer | 30 |
| Alkyd resin | 60 |
| Urea-formaldehyde resin | 10 |

The vinyl copolymer was a copolymer of styrene (40%), ethyl acrylate (50%), and acrylamide (10%). The solubility parameter was 11.0. The alkyd resin was of the phthalic anhydride-glycerol type modified with 37% coconut oil. The acid number was 21.2 and the solubility parameter was 10.0.

The urea-formaldehyde resin was the butylated type sold under the trade name "Uformite" F–240. The solubility parameter was 10.0.

Films drawn from this blend and subsequently baked at 120° C. for 25 minutes remained clear and adhered strongly to the glass or steel surface on which they were drawn. The films exhibited excellent gloss and flexibility and were resistant to any but most severe conditions of attack by chemicals such as acid or alkali.

EXAMPLE VIII

A blend of the vinyl copolymer and the alkyd resin, referred to in Example VII, and with a melamine-formaldehyde resin was also made. The proportions were the same as in Example VII. The melamine-formaldehyde resin was of the butylated type sold under the trade name "Resimene" 881. Its solubility parameter was 9.7.

After spreading the blend on a glass slide or sheet metal by means of a doctor blade and baking the film so obtained at 125° C. for 20 minutes the films were again found to be clear and flexible and of excellent gloss.

The blends described in Examples VII and VIII yielded clear films also after being catalyzed with 0.3 weight percent (based on combined vinyl copolymer and nitrogen resin solids) p-toluene sulphonic acid and baked at 120° C. for 30 minutes.

EXAMPLE IX

A blend was made of:

(a) 60% of the 37% coconut oil alkyd used in Example VII (b) 30% of a vinyl copolymer containing styrene (64%), ethyl acrylate (30%) and acrylamide (6%), solubility parameter 10.2

(c) 10% of butylated urea-formaldehyde resin known as "Uformite" F–240

When this blend was baked for 30 min. at 120° C. in the absence of an acid catalyst a slightly cloudy film resulted. A second panel was baked, however, where 0.3% p-toluenesulphonic acid catalyst had been added to the resin blend (i.e. 0.3% on vinyl copolymer and nitrogen resin solids). The catalysed panel was also baked for 30 min. at the same temperature and a clear film resulted.

EXAMPLE X

A white industrial enamel finish was prepared as follows:

(a) Alkyd resin 876 g. coconut oil were heated in the presence of 333 g. glycerine and 1½ g. of LiOH catalyst to a temperature of 230° C. and held at this temperature until the monoglyceride of the oil was formed.

The temperature of the cook was reduced to 175° C. at which time 1089 g. phthalic anhydride and a further 211 g. glycerine were added, along with 200 g. xylene as solvent. The reactants were allowed to condense at temperatures ranging up to 195° C. Xylene reflux was used to carry off the water formed in the condensation of phthalic anhydride and glycerine or monoglyceride.

The condensation was allowed to continue until the acid number of the resin formed reached a value of 21.2. The resultant product was then cooled and 2300 g. xylene were added to bring the material to 50% total solids.

(b) Vinyl copolymer

A copolymer of 60% styrene, 30% ethyl acrylate and 10% acrylamine was prepared by adding to a 2 l. flask

|  | G. |
|---|---|
| Acrylamide | 50 |
| Ethyl acrylate | 100 |
| Styrene | 200 |
| Butanol | 75 |
| Xylene | 175 | and raising the temperature to bring these ingredients to reflux. Over a period of 1 hour the following ingredients were then added:

|  | G. |
|---|---|
| Ethyl acrylate | 50 |
| Styrene | 100 |
| Xylene | 250 |
| Benzoyl peroxide | 5 |
| Tert. butyl hydroperoxide (60% soln. in butanol) | 8 |

The copolymer was obtained after the reaction had been allowed to proceed at reflux temperature for a further 4 hours.

(c) Mill base

The mill base was prepared by milling together the following components:

|  | Parts |
|---|---|
| TiO$_2$ | 136.0 |
| Alkyd resin from (a) | 46.5 |
| Xylol | 16.5 |

The enamel finish was then prepared by intimately mixing the following ingredients:

|  | Parts |
|---|---|
| Mill base from (c) | 33.90 |
| Alkyd resin from (a) | 19.37 |
| Vinyl copolymer from (b) | 27.80 |
| Benzoguanamine-formaldehyde resin ("Uformite" MX-61) | 10.08 |
| Carnauba wax | 0.20 |
| Butanol | 1.00 |
| p-Toluene sulphonic acid (10% soln. in butanol) | 0.75 |
| Xylene | 6.90 |
|  | 100.00 |

The above composition was sprayed on to an unprimed panel of sheet metal and baked at 150° C. for 30 minutes. On removal from the oven it had good gloss and hardness.

EXAMPLE XI

COMPATIBILITY OF VARIOUS VINYL COPOLYMERS AT VARIOUS RATIOS WITH ALKYD RESIN OF EXAMPLE X AND VARIOUS N-RESINS

[Catalysed with 0.3% p-toluene sulphonic acid on V/N solids and baked for 30′ at 120° C.]

| Vinyl Copolymer Composition | Ratio A/V/N-N-Resin | (a) 10% Nitrogen Resin | | | (b) 20% Nitrogen Resin | | | (c) 40% Nitrogen Resin | | (d) 60% N-Resin |
|---|---|---|---|---|---|---|---|---|---|---|
| | | 60/30/10 | 40/50/10 | 20/70/10 | 50/30/20 | 30/50/20 | 10/70/20 | 30/30/40 | 10/50/40 | 10/30/60 |
| S/EA/Aam—40/50/10 | Urea-Formaldehyde ("Uformite" F 240). | C | C | C | C | C | C | C | C | C |
| S/BA/Aam—20/70/10 | | C | C | C | C | C | C | C | C | C |
| S/BMA/Aam—60/30/10 | | C | C | C | C | C | C | C | C | C |
| BMA/MMA/Aam—80/10/10 | | C | C | C | C | C | C | C | C | C |
| S/BA/Aam—20/70/10 | Melamine-Formaldehyde ("Resimene" 881). | I-C | C | C | C | C | C | C | C | I-C |
| S/MMA/Aam—64/30/6 | | C | C | C | C | C | C | C | C | C |
| S/BMA/Aam—60/30/10 | | C | C | C | C | C | C | I-C | C | I-C |
| BMA/MMA/Aam—80/10/10 | | C | C | C | C | C | C | C | C | C |
| S/Aam—90/10 | Benzoguanamine-Formaldehyde ("Uformite" MX-61). | I-C | C | C | C | C | C | C | C | C |
| S/Aam/AN—88.75/6.25/5 | | C | C | C | C | C | C | C | C | C |
| S/BA/Aam—20/70/10 | | C | C | C | C | C | C | C | C | C |
| S/BMA/Aam—60/30/10 | | I-C | — | C | I-C | — | C | C | C | C |
| S/Aam—90/10 | Short Cycle Urea-Formaldehyde. | C | — | C | C | — | C | C | C | C |
| S/EA/Aam—40/50/10 | | C | — | C | C | — | C | C | C | C |
| S/BA/Aam—20/70/10 | | C | — | C | C | — | C | C | C | C |
| S/BMA/Aam—60/30/10 | | C | — | C | C | — | C | C | C | C |
| BMA/MMA/Aam—80/10/10 | | C | — | C | C | — | C | C | C | C |

KEY TO SYMBOLS:
I-C—Slightly incompatible
C—Compatible
Aam—Acrylamide
AN—Acrylonitrile
BA—Butyl Acrylate
BMA—Butyl Methacrylate
EA—Ethyl Acrylate
MMA—Methyl Methacrylate
S—Styrene
VT—Vinyl-Toluene

EXAMPLE XII

This example serves to illustrate the necessity for having present in the vinyl copolymer a vinyl comer having as part of its structure a basic nitrogen atom or an amido nitrogen atom.

(a) A copolymer was made of 28% styrene and 72% ethyl acrylate. Its solubility parameter was 10.2.

(b) A copolymer was made of 25% styrene, 70% ethyl acrylate, and 5% acrylamide. Its solubility parameter was 10.5.

Copolymers (a) and (b) were separately blended with an alkyd resin of 37.2% coconut oil, solubility parameter 10.0 and acid number 7.5, at levels 1:3, 1:1 and 3:1. Copolymer (a) was incompatible at all three levels. Despite a larger difference in solubility parameter copolymer (b) was compatible at all three levels.

What we claim is:

1. A coating composition comprising an admixture of a preformed copolymer of a vinyl monomer having as part of its structure a basic nitrogen atom or an amido nitrogen atom, and of at least one of the monomers selected from (1) a compound selected from the group consisting of styrene and alkylated styrenes and (2) an acrylic acid ester of the general formula $$CH_2=C-COOR_2$$
$$|$$
$$R_1$$

wherein $R_1$ is a member of the group consisting of hydrogen and lower alkyl radicals which may be substituted and $R_2$ is an alkyl radical having from 1 to 6 carbon atoms which may also be substituted, and of an oil-modified alkyd resin.

2. A coating composition according to claim 1 in which the copolymer and the alkyd resin have a difference in solubility parameter not exceeding 2.5.

3. A coating composition according to claim 1 in which the alkyd resin has an acid number in excess of 5.

4. A coating composition comprising an admixture of a preformed copolymer of a vinyl monomer having as part of its structure a basic nitrogen atom or an amido nitrogen atom, and of at least one of the monomers selected from (1) a compound selected from the group consisting of styrene and alkylated styrenes and (2) an acrylic acid ester of the general formula $$CH_2=C-COOR_2$$
$$|$$
$$R_1$$

wherein $R_1$ is a member of the group consisting of hydrogen and lower alkyl radicals which may be substituted and $R_2$ is an alkyl radical having from 1 to 6 carbon atoms which may also be substituted, and of an oil-modified alkyd resin havng an oil length from about 25% to about 70%.

5. A coating composition according to claim 4 in which the alkyd resin has an oil length from 30% to 45%.

6. A coating composition according to claim 1 in which the vinyl monomer having as part of its structure a basic nitrogen atom or an amido nitrogen atom contributes to between 5 and 10% by weight of the copolymer.

7. A coating composition according to claim 6 in which the vinyl monomer having as part of its structure a basic nitrogen atom or an amido nitrogen atom contributes to between 7.5 and 10% by weight of the copolymer.

8. A coating composition according to claim 1 in which the copolymer comprises between 10 and 80% by weight of the copolymerized acrylic acid ester.

9. A coating composition according to claim 8 in which the copolymer comprises between 45 and 70% by weight of the copolymerized acrylic acid ester.

10. A coating composition comprising a clear, homogeneous blend of a preformed copolymer, obtained by polymerising a composition which includes from 5 to 10% by weight of acrylamide and a substantial proportion of at least one of the monomers selected from (1) a compound selected from the group consisting of styrene and alkylated styrenes and (2) an acrylic acid ester of the general formula $$CH_2=C-COOR_2$$
$$|$$
$$R_1$$

wherein $R_1$ is a member of the group consisting of hydrogen and lower alkyl radicals which may be substituted and $R_2$ is an alkyl radical having from 1 to 6 carbon atoms which may also be substituted, and of an oil-modified alkyd resin.

11. A coating composition according to claim 1 which also includes a nitrogen resin selected from the group of formaldehyde condensation products consisting of urea-formaldehyde resins, melamineformaldehyde resins and benzo-guanamine-formaldehyde resins.

12. A coating composition according to claim 11 in which the nitrogen resin content ranges from 5 to 40% by weight of the composition.

13. A coating composition according to claim 11 which includes an acid catalyst suitable for accelerating cross-linking of the nitrogen resin with the copolymer on curing.

14. A coating composition according to claim 13 in which the acid catalyst is p-toluene sulphonic acid.

15. A coating composition according to claim 13 in which the acid catalyst is present in proportions from 0.2 to 0.5% by weight of the vinyl copolymer and nitrogen resin solids.

16. A coating composition comprising a clear, homogeneous blend of an oil-modified alkyd resin having an acid number in excess of 5, of a nitrogen resin selected from the group of formaldehyde condensation products comprising urea-formaldehyde resins, melamine-formaldehyde resins and benzoguanamine-formaldehyde resins and of a preformed copolymer obtained by polymerising a composition which includes a vinyl monomer having as part of its structure a basic nitrogen atom or an amido nitrogen atom and at least one of the monomers selected from (1) a compound selected from the group consisting of styrene and alkylated styrenes and (2) an acrylic acid ester of the general formula $$CH_2=C-COOR_2$$
$$|$$
$$R_1$$

wherein $R_1$ is a member of the group consisting of hydrogen and lower alkyl radicals which may be substituted and $R_2$ is an alkyl radical having from 1 to 6 carbon atoms which may also be substituted.

17. A coating composition according to claim 16 comprising, as the vinyl monomer having as part of its structure a basic nitrogen atom or an amido nitrogen atom, from 3 to 10%, by weight of the comers, of acrylamide.

References Cited in the file of this patent

UNITED STATES PATENTS

| | | |
|---|---|---|
| 2,598,663 | Kropa | June 3, 1952 |
| 2,688,008 | Cheney | Aug. 31, 1954 |
| 2,818,399 | Drechsel | Dec. 31, 1957 |
| 2,848,432 | Schulken et al. | Aug. 19, 1958 |
| 2,865,874 | Christenson | Dec. 23, 1958 |
| 2,890,186 | Sample | June 9, 1959 |
| 2,919,254 | Christenson et al. | Dec. 29, 1959 |